United States Patent [19]

Vannucci

[11] Patent Number: 5,150,377
[45] Date of Patent: Sep. 22, 1992

[54] DIRECT SEQUENCE SPREAD SPECTRUM (DSSS) COMMUNICATIONS SYSTEM WITH FREQUENCY MODULATION UTILIZED TO ACHIEVE SPECTRAL SPREADING

[75] Inventor: Giovanni Vannucci, Middletown, N.J.

[73] Assignee: AT&T Bell Laboratories, Murray Hill, N.J.

[21] Appl. No.: 608,418

[22] Filed: Nov. 2, 1990

[51] Int. Cl.$^5$ .............................................. H04K 1/00
[52] U.S. Cl. ...................................................... 375/1
[58] Field of Search .......................................... 375/1

[56] References Cited

U.S. PATENT DOCUMENTS

| | | | |
|---|---|---|---|
| 4,912,722 | 3/1990 | Carlin | 375/1 |
| 5,005,169 | 4/1991 | Bronder et al. | 375/1 |
| 5,016,255 | 5/1991 | Dixon et al. | 375/1 |

OTHER PUBLICATIONS

"A Note on Complex Sequences with Low Correlations", by Ian F. Blake and Jon W. Mark, IEEE Transactions on Information Theory, vol. IT-28, No. 5, Sep. 1982, pp. 814-816.

"GMSK Modulation for Digital Mobile Radio Telephony", by Kazuaki Murota & Kenkichi Hirade, IEEE Transactions on Communications, vol. COM-29, No. 7, Jul. 1981.

Primary Examiner—Thomas H. Tarcza
Assistant Examiner—David Cain
Attorney, Agent, or Firm—A. G. Steinmetz

[57] ABSTRACT

Hardware complexity of transmitting and receiving equipment in a CDMA (Code Division Multple Access) cellular radio transmission system, embodying the principles of the invention, is reduced by the use of frequency modulation (FM) techniques to achieve spectral spreading in combination with signal modulation.

The spectral spreading technique of a CDMA cellular radio telephone communications system is generalized by extending the range of values allotted to the spreading waveform code signal to include complex numbers of unity magnitude. This permits the addition of a baseband version of the information signal and spreadying waveforms instead of the conventional multiplication of the two signals in existing DSSS (Direct Sequence Spread Spectrum) communications sytems. The resultant summed signal is used to control a VCO (Voltage Controlled Oscillator) to produce a frequency modulated spread signal to be transmitted. This arrangement permits improved and more efficient implementations of the transmitting and receiving equipment.

18 Claims, 5 Drawing Sheets

DIRECT SEQUENCE SPREAD SPECTRUM (DSSS) COMMUNICATIONS SYSTEM WITH FREQUENCY MODULATION UTILIZED TO ACHIEVE SPECTRAL SPREADING

FIELD OF THE INVENTION

This invention relates to radio communication systems and in particular communication systems using direct sequence spread spectrum (DSSS) communication techniques.

BACKGROUND OF THE INVENTION

DSSS radio transmission systems, in contrast to more traditional radio transmission systems, use a signal bandwidth that is much broader than the information signal bandwidth. A wide band signal is generated by multiplying the narrowband information signal with a binary code, often designated as a spreading code, to generate the wideband signal that is transmitted. The original information signal can be recreated at the receiver by multiplying the received wideband signal by the same binary code (now designated as a de-spreading code) used to generate the wideband transmitted signal. In order to recover the intelligence the spreading and de-spreading codes must be in synchronism and amplitude match with each other.

DSSS transmission technology is now being applied to multi-user transmission systems such as cellular radio telephone systems. In such applications it is designated as code division multiple access (CDMA) to distinguish it from the prior TDMA (time division multiple access) and FDMA (frequency division multiple access) systems now in use. In the CDMA system the individual user channels (which are not distinguished by time of transmission or frequency differences) are each individually identified by a unique spreading and de-spreading code at both the transmitting and receiving end which is used to recover the individual users signal from the signals of other users and from background noise and interference.

SUMMARY OF THE INVENTION

The spectral spreading technique of a CDMA cellular radio telephone communications system is generalized by extending the range of values allotted to the spreading waveform code signal to include all complex numbers of unity magnitude. This permits the addition of a baseband version of the information signal and the spreading waveforms instead of the conventional multiplication of the two signals performed in existing DSSS communications systems. The resultant summed signal is used to control a Voltage Controlled Oscillator (VCO) to produce a frequency-modulated spread-spectrum signal suitable for transmission. This arrangement permits improved and more efficient hardware implementations of the transmitting and receiving equipment.

DETAILED DESCRIPTION

Figure 1:
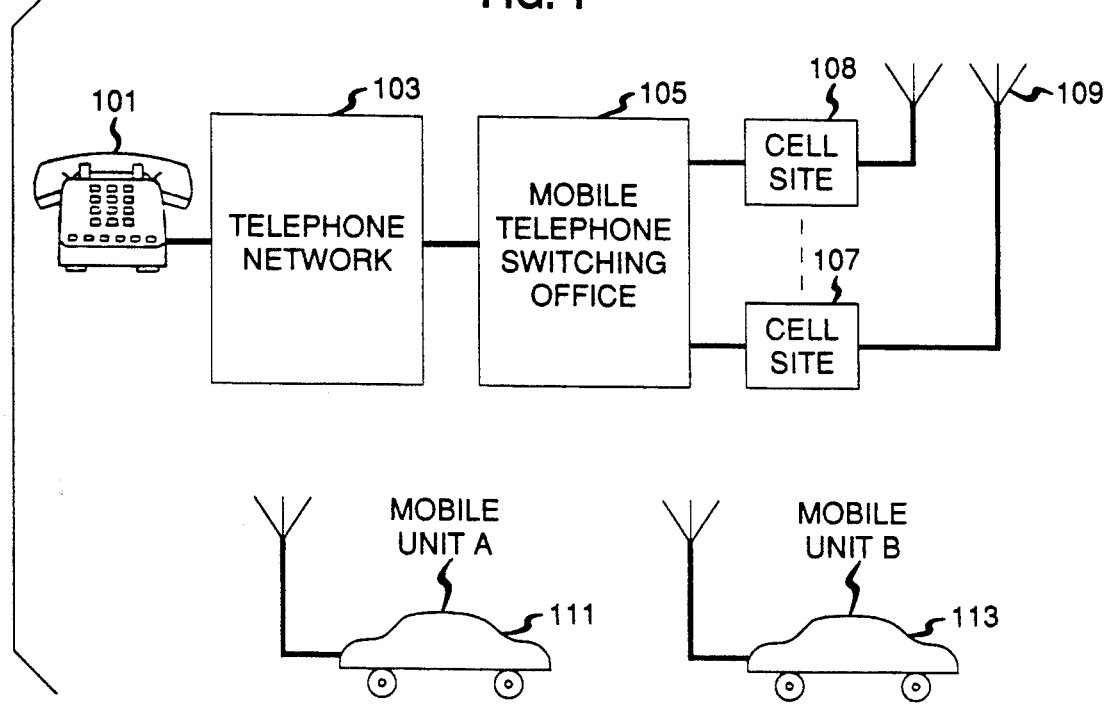
FIG. 1 is a block diagram of a typical cellular radio telephone system.

A block diagram of a cellular telephone system using spread spectrum communications methods is shown in FIG. 1. A subscriber set 101 is connected, as shown, through a land telephone switching network 103 to a mobile telephone switching office 105. The mobile telephone switching office 105 is in turn connected to a cell site transmitter 107 which transmits radiotelephone signals, via antenna 109, to the mobile units 111 and 113. As is common in cellular radiotelephone systems the mobile telephone switching office 105 is also connected to additional cell sites 108 each of which is typically dedicated to a different geographical area or cell.

Each individual mobile unit 111 and 113 transmits to and receives from the cell site 107 radiotelephone information signals in a different transmission channel which in DSSS is defined by a unique spreading code in each independent channel. In the DSSS communication system shown, the spreading codes utilize complex numbers having unity magnitude. Frequency modulation techniques are utilized to achieve the signal spreading with reduced complexity of the transmission and receiving equipment.

Figure 2:
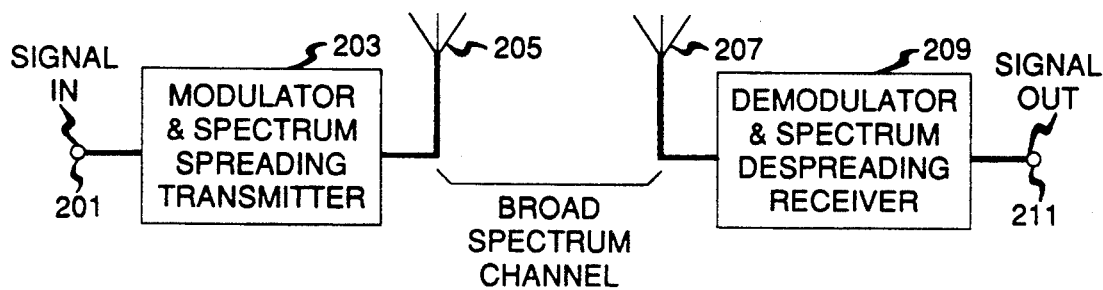
FIG. 2 is a block diagram illustrating CDMA principles that are applied to a particular transmission channel of the cellular radio telephone system of FIG. 1.

A block schematic of one of the transmission channels between a cell site and a mobile unit is shown in FIG. 2. A narrowband information signal to be transmitted is applied, via an input 201, to a modulator and spectrum spreading transmitter 203 which converts the narrowband information signal to a broadband signal for radio transmission, via antenna 205. The broadband transmitted signal is received by antenna 207 and coupled to the demodulator and de-spreading receiver 209. Receiver 209 separates the narrowband information intended for this particular receiver by replicating the spreading code applied to the information signal prior to transmission and using it to de-spread and demodulate the received signal and extract the originally transmitted narrowband information signal for presentation at lead 211.

In a spread spectrum transmission system the transmitted spread spectrum signal $s_B$ is derived from the product of a spreading signal waveform or pseudo-random chip sequence $PN(t)$ and a narrowband information signal $s_N$. This may be expressed as:

$$s_B(t) = PN(t)s_N(t), \quad (1)$$

This narrowband signal $s_N$ may be represented in a generalized complex form, and expressed as:

$$s_N(t) = A(t)\exp[j(\omega_0 t + \phi_s(t))]. \quad (2)$$

where $\omega_0$ is the carrier angular frequency, $A(t)$ is the amplitude modulation and $\phi_s(t)$ is the phase modulation.

The spectral spreading waveform $PN(t)$ may also be embodied in a generalized complex form, which is expressed as:

$$PN(t) = \exp[+j\phi_{PN}(t)], \quad (3)$$

where $\phi_{PN}(t)$ represents the pseudo-random phase modulation signal. Traditionally $\phi_{PN}(t)$ is constrained to discrete values such as values from the set $\{0,\pi\}$ or values from the set $\{0, \pi/2, \pi, 3\pi/2\}$. In the apparatus herein embodying the invention, $\phi_{PN}(t)$ is allowed to have any value in the continuum from 0 to $2\pi$. The waveform is still constrained to a unity magnitude, i.e., $\|PN\|^2 = 1$. However, no restrictions are imposed on the format of the narrowband information signal. Despreading in this arrangement is achieved through multiplication by a waveform similar to $PN(t)$ but with a minus sign in place of the plus sign in eq (3); i.e. the pseudo-random phase modulation signal is subtracted out.

If an FM signal is chosen for the information signal transmitted, the broadband signal is represented by the following expression;

$$S_B(t) = A_0 \exp\{j[\omega_0 t + \phi_s(t) + \phi_{PN}(t)]\} \quad (4)$$
$$= A_0 \exp\left\{j\left[\omega_0 t + m\int_0^t (b(\tau) + b_{PN}(\tau))d\tau\right]\right\}$$

where $A_0$ is a constant; $b(t)$ is the baseband signal to be transmitted; and $b_{PN}(t) \triangleq (1/m)\phi_{PN}(t)$ is the baseband version of the spreading waveform $PN(t)$. It is apparent from the foregoing that a spread spectrum transmitter is realized herein by adding the spreading signal and the narrowband information signal prior to frequency modulation of the carrier.

Figure 9:
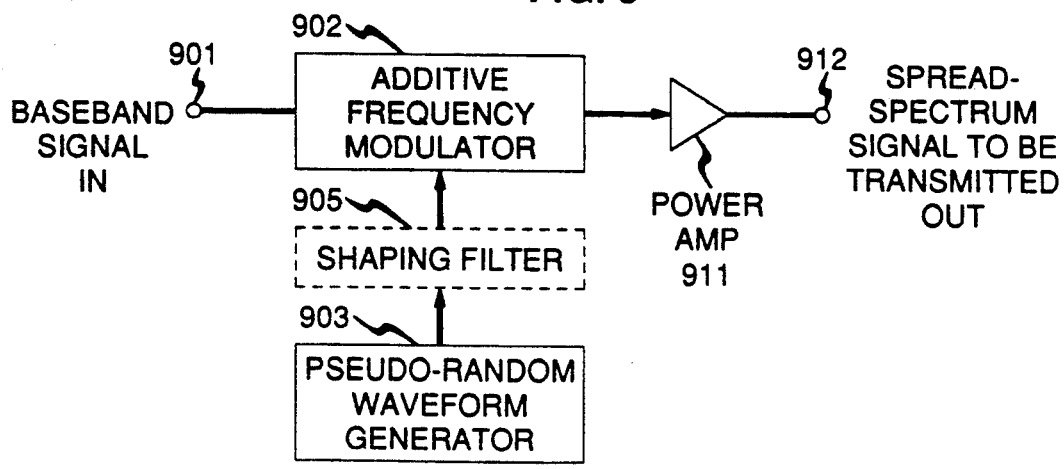
FIG. 9 is a block diagram of a transmission apparatus for a frequency modulated direct sequence spread spectrum signal.

Transmission apparatus illustrating the principles of the invention is shown in FIG. 9. A spread spectrum signal is generated by combining an information signal with a spreading waveform and using the resulting signal to frequency modulate a carrier in an additive frequency modulator apparatus 902. The baseband signal applied to the input 901 is additively combined with a spreading signal generated by waveform generator 903 and is used to control a carrier frequency to generate a frequency modulated spread spectrum signal. This signal is coupled by amplifier 911 to output lead 912.

Figure 3:
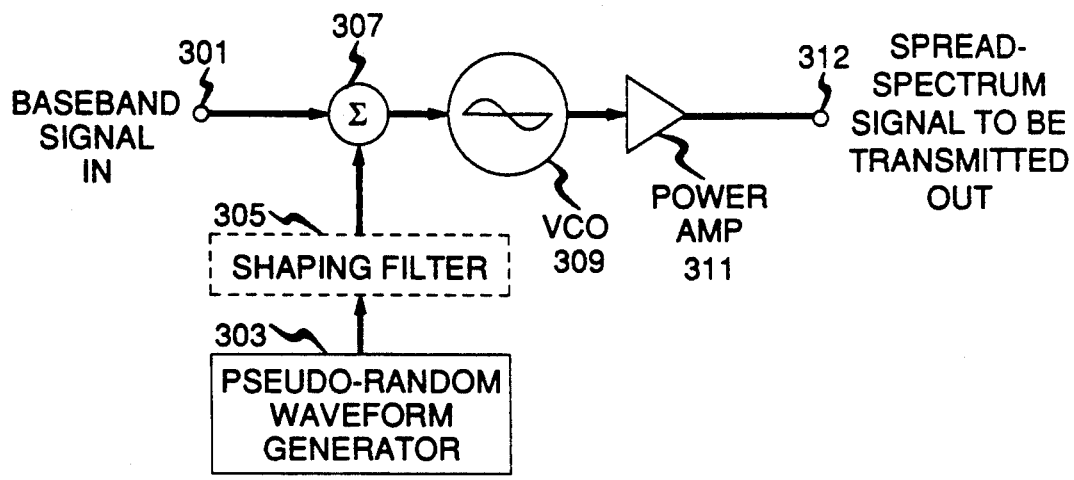
FIG. 3 is a block diagram of one embodiment of a transmitter for a frequency modulated direct sequence spread spectrum signal that uses summation and a VCO to combine the spreading waveform and the base band signal.

An illustrative signal exemplary transmission circuit using a complex spreading code and frequency modulation scheme according to the principles of the invention is shown in block diagram form in FIG. 3. The baseband signal at input 301 is summed in a summing circuit 307 with a spreading code generated by the waveform generator 303 and filtered, if desired, by a low pass filter 305 to achieve a continuous phase modulation by the spreading waveform and to control spectral spreading of the output waveform. Further explanation of such pulse shaping and its effects is provided in an article "GMSK Modulation for Digital Mobile radio Telephony" by K. Murota et al., *IEEE Transactions on Communications*, Vol. COM-29, No. 7, Jul. 7, 1981, pp. 1044–1050. This reference is incorporated by reference into the present specification.

Figure 5:
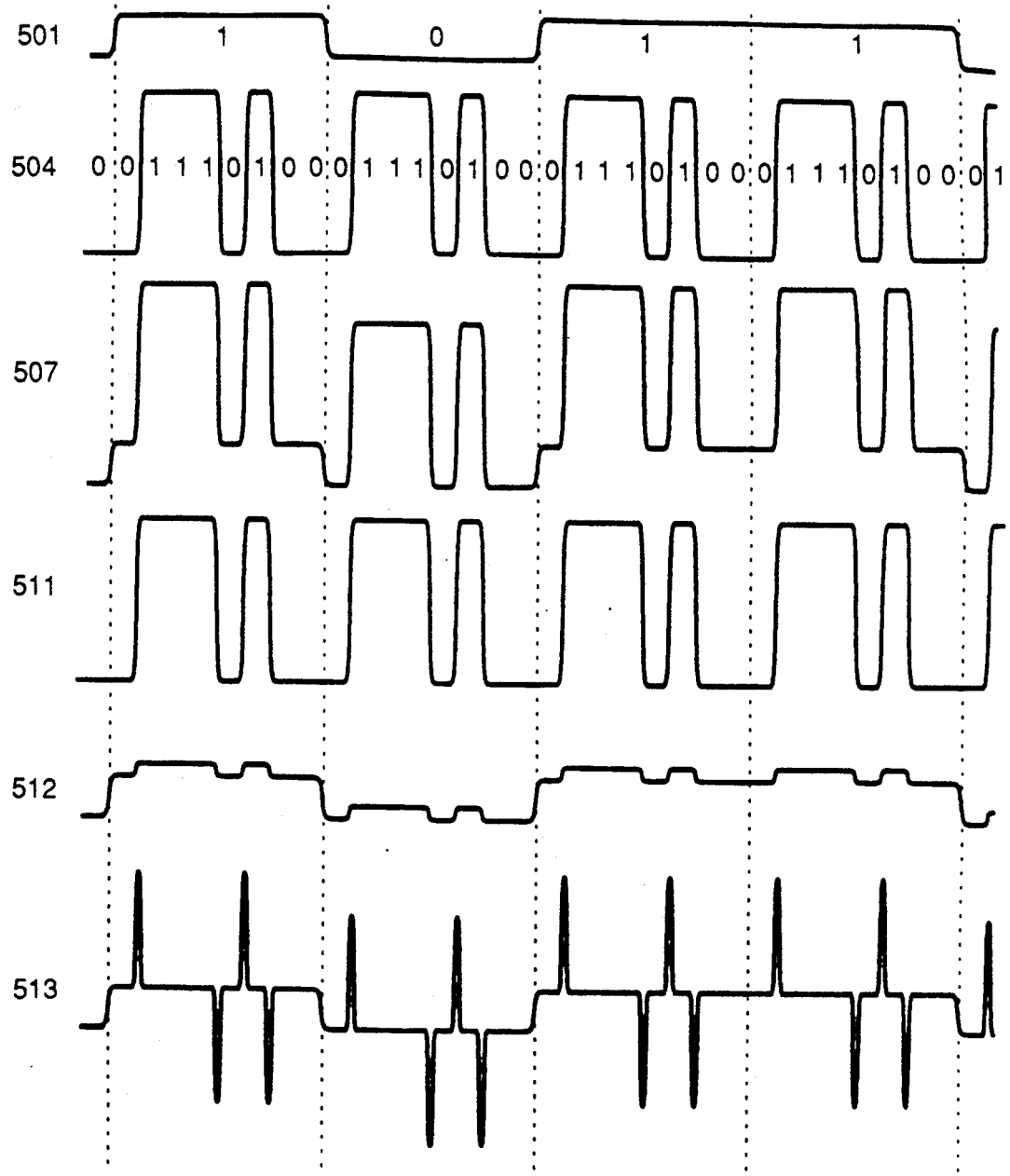
FIG. 5 discloses sample FM baseband waveforms useful in describing the operation of the CDMA cellular radio telephone system.

The baseband input signal may be a bit sequence such as is shown by waveform 501 in FIG. 5. The spreading code applied to the summing circuit 307 may be a chip sequence such as shown by spreading code waveform 504 in FIG. 5.

The resultant summed signal is shown by waveform 507 in FIG. 5. It is applied to a voltage controlled oscillator 309, whose operating frequency is centered about the desired carrier frequency $\omega_0$ to frequency modulate the signal generated therein. The resulting broadband signal is the product of the desired narrowband FM signal (as would be obtained by modulating with waveform 501 alone) multiplied by the spectral spreading waveform $PN(t)$ given by equation (3). This signal is amplified by amplifier 311 and the resulting spread spectrum signal at output lead 312 is coupled to a transmitting antenna as shown in the system disclosed in FIG. 1.

Figure 4:
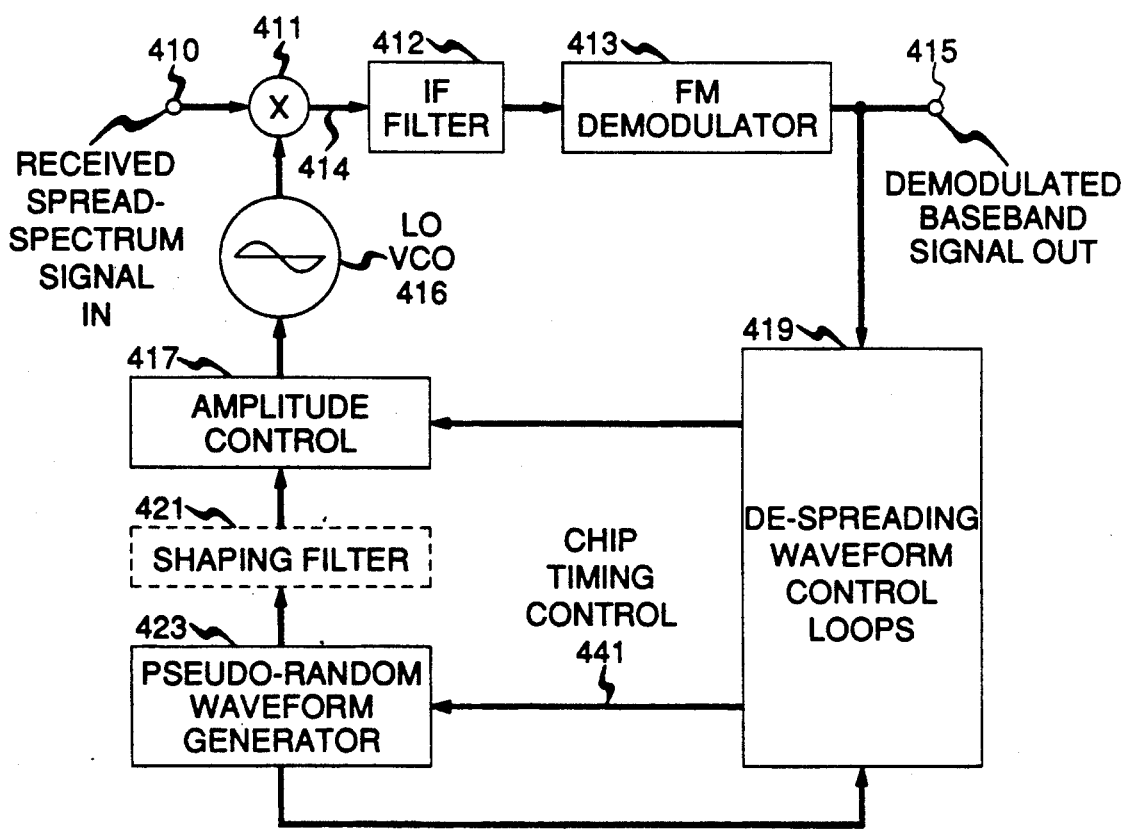
FIG. 4 is a block diagram of a receiver for a frequency modulated direct sequence spread spectrum system.

A radio receiver is shown in block schematic form in FIG. 4. The detected signal is coupled from the receiving antenna to the input terminal 410 and applied to a multiplier 411. The output of a local VCO oscillator 416 is also applied to the multiplier 411. Local oscillator 416 is frequency modulated by the same waveform 504 as applied in the transmitter of FIG. 3 to achieve spectral spreading. An IF filter 412 selects an IF signal output of multiplier 411 from which the spreading code has been removed and applies it to an FM demodulator 413 which supplies the demodulated baseband signal at the output lead 415. If the de-spreading waveform is substantially identical to the spreading waveform, then the oscillator 416 center frequency faithfully tracks the received carrier and the narrowband modulated signal component of the transmitted signal appears at input lead 414 of the IF filter 412.

In order to accurately detect the transmitted information at the receiver output the de-spreading code, applied to the received signal, must be properly synchronized and amplitude matched with the spreading code applied at the transmitter. Such synchronization and matching are achieved by means of a feedback network. Associated with the feedback network are the waveform feedback control loops 419, the amplitude control circuit 417, the filter 421 and waveform generator 423 included in the receiver for generating the de-spreading waveform and controlling its shape, amplitude and timing.

The feedback network in the illustrative embodiment of FIG. 4 includes the waveform generator 423 operative for generating the required baseband de-spreading code with its timing and amplitude controlled by the de-spreading waveform feedback control loops 419. A filter 421 shapes the de-spreading code before it is applied to the amplitude control circuit 417 and should match the shaping filter used in the transmitter.

In the illustrative example of FIG. 4 a heterodyne method of de-spreading is used whereby the received signal is simultaneously de-spread by application of the de-spreading code and down converted to an intermediate frequency in the multiplier 411. The signal generated by the oscillator 416 is frequency modulated by the de-spreading code and hence the narrowband modulated information signal is extracted from the broadband signal for application to the FM demodulator 413.

The oscillator signal of oscillator 416 may be represented analytically by the following expression.

$$s_L(t) = A_L \exp\{j[\omega_L t + \hat{\phi}_{PN}(t)]\} \quad (5)$$

Here the terms $A_L$ and $\omega_L$ represent the oscillator 416's amplitude and frequency and $\hat{\phi}_{PN}(t)$ represents the pseudo-random phase modulation signal replicated at the receiver of FIG. 4 for the purpose of de-spreading the received signal.

The output of the multiplier 411 is represented analytically by the following expression.

$$s_{IF}(t) = s_R(t)s_L^*(t) \quad (6)$$

The term $s_R(t)$ represents the received spread spectrum signal. The received broadband signal $s_R(t)$ is, in the absence of noise, the transmitted broadband signal $s_B(t)$ as reduced by the transmission loss $\eta$. The signal $s_R(t)$ is expressed as $$s_R(t) = \eta s_B(t) \quad (7)$$

The expanded expression for the IF signal becomes the following equation (8):

$$s_{IF}(t) = \eta A_0 A_L \exp\{j[(\omega_0 - \omega_L)t + \phi_S(t) + (\phi_{PN}(t) - \hat{\phi}_{PN}(t))]\} \quad (8)$$

In order to extract the narrowband signal from the received spectrally spread signal in the receiver, the pseudo-random de-spreading waveform $\hat{\phi}_{PN}(t)$ must be precisely matched and synchronized with the spreading waveform used by the transmitter. The needed pseudo-random waveform is generated by the pseudo-random waveform generator 423.

The desired match is achieved by means of two control loops; one for the amplitude matching and one for the timing control. The operation of the control loops is based on the observation that, if there is an amplitude mismatch between $\phi_{PN}(t)$ and $\hat{\phi}_{PN}(t)$ the output of the FM demodulator will include a small amount of the baseband spreading signal, $b_{PN}(t)$, in proportion to the amount of mismatch. Similarly, if there is a timing mismatch, the FM demodulator output will include a small amount of the derivative of the baseband spreading signal, in proportion to the amount of mismatch.

By correlating the demodulator output with the de-spreading waveform and its derivative, we obtain two correlation signals proportional to the amplitude and timing mismatch, respectively. These two signals are used in two control loops to adjust the amplitude and phase of the de-spreading waveform until the two signals each become zero, which corresponds to an ideal match. The associated baseband waveforms are shown in FIG. 5. The waveform 511 represents the de-spreading waveform and the waveform 512 represents the FM demodulator output in the presence of amplitude mismatch. The effect of a timing mismatch is shown by the waveform 513 which is the FM demodulator output in the presence of a timing mismatch.

Figure 6:
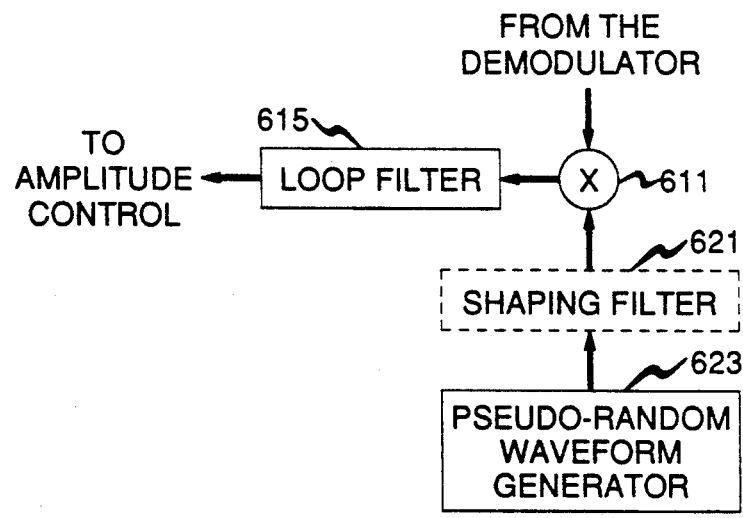
FIG. 6 is a block diagram of one of the control loops shown in FIG. 4.

Details of the control loop for controlling the amplitude of the de-spreading waveform are shown in the block schematic of FIG. 6. The input to the multiplier 611 is supplied by the FM demodulator 413 (shown in FIG. 4) and is multiplied by the output of the shaping filter 621 which filters the output of the pseudo-random waveform generator 623. The output of the multiplier 611 is applied to a loop filter 615 whose output controls the amplitude of the de-spreading waveform (as shown in FIG. 4)

Figure 7:
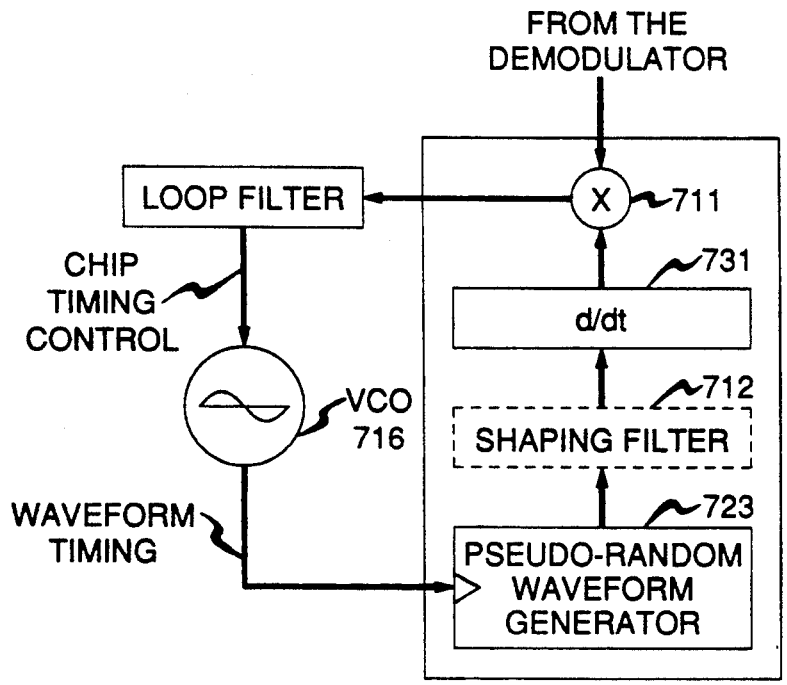
FIG. 7 is a block diagram of another control loop shown in FIG. 4.

The control loop for controlling the timing of the de-spreading waveform is shown in schematic block form in FIG. 7. The de-spreading waveform output of the pseudo-random waveform generator 723 is coupled, via the shaping filter 712, to a differentiator 731 which produces the derivative of the de-spreading waveform and applies it to the multiplier 711. The DC component in the output of multiplier 711 is a signal proportional to the phase error of the locally generated pseudo-random waveform relative to that of the transmitter and is coupled, via the loop filter 715, and applied to the voltage controlled oscillator 716 which, in turn, generates chip timing for the pseudo-random waveform generator 723. This feedback loop operates like a phase lock loop. Phase lock loops are well known in the art, hence it is not believed necessary to disclose it in detail herein.

Figure 8:
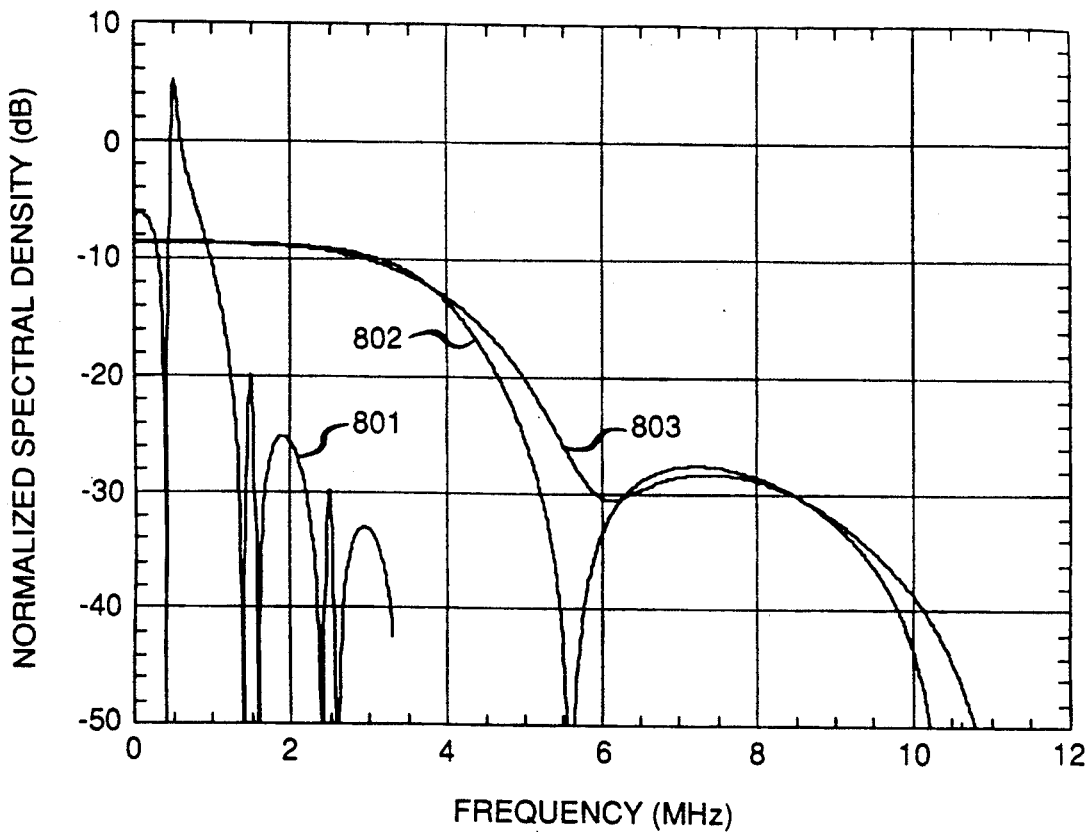
FIG. 8 is a graph showing a plot comparing the respective power spectra of spread and unspread signals.

The power spectra for a transmitted signal of a CDMA transmission system, embodying the principles of the invention, are shown graphically in FIG. 8. The actual information signal and the spreading waveform producing these spectra are those identified as waveforms 501 and 504 shown in FIG. 5. The power spectrum of the unspread information signal is shown by waveform 801. The power spectrum of the spreading signal (as defined in equation 3) is shown by the waveform 802. The power spectrum of the combined information signal and spreading signal is shown by waveform 803. In the illustrative system the spectrum spreading waveform 802 closely approximates the spectrum waveform 803 of the actual transmitted RF signal.

I claim:

1. A spread spectrum transmission apparatus comprising:

means for accepting a baseband signal containing information, means for generating a spreading waveform, means for combining the spreading waveform with the baseband signal to produce by the sum thereof a spread spectrum signal that is frequency modulated.

2. A spread spectrum transmission apparatus comprising:

means for accepting a baseband signal containing information, means for generating a spreading waveform, means for combining the spreading waveform with the baseband signal to produce by the sum thereof a spread spectrum signal that is frequency modulated, the means for combining including:

means for summing the base band signal and the spreading waveform, and a voltage controlled oscillator responsive to the means for summing.

3. A spread spectrum transmission apparatus as claimed in claim 2 wherein the means for combining comprises:

a filter coupled for achieving a continuous spreading waveform prior to application to the voltage controlled oscillator.

4. A radio transmitter for a spread spectrum cellular telephone system, comprising:

means for accepting a baseband signal containing information, means for generating a spreading waveform, means for summing the spreading waveform with the baseband signal, means responsive to the means for summing for producing a frequency modulated signal with spread spectrum, and means for transmitting the frequency modulated signal.

5. A radio transmitter for a spread spectrum cellular telephone system, comprising:

means for accepting a base band signal containing information, means for generating a spreading waveform, means for summing the spreading waveform with the baseband signal, means responsive to the means for summing for producing a frequency modulated signal with spread spectrum, and means for transmitting the frequency modulated signal, filtering means for producing a continuous spreading waveform prior to application to the means for summing.

6. A radio transmitter as claimed in claim 5 wherein the means for producing a frequency modulated signal includes a voltage controlled oscillator.

7. A spread spectrum receiving apparatus comprising:

means for generating a replica of a spreading signal used for spreading a transmitted signal, means for frequency modulating a signal in response to the replica of a spreading signal, means for receiving a signal with spread spectrum, means for mixing the frequency modulated signal and the received spread spectrum signal to produce a signal of an intermediate frequency less than that of the received spread spectrum signal, means for recovering an original information signal from the signal of an intermediate frequency.

8. A spread spectrum receiving apparatus as claimed in claim 7 and further including:

a feedback circuit for controlling an amplitude of a signal output of the means for generating a replica.

9. A spread spectrum receiving apparatus as claimed in claim 7 and further including:

a feedback circuit for controlling timing of a signal output of the means for generating a replica.

10. A spread spectrum receiving apparatus as claimed in claim 7 and further including:

an FM demodulator circuit coupled to receive the signal of an intermediate frequency;

a circuit for determining a correlation of the replica of the spreading signal and an output of the FM demodulator circuit; and a feedback circuit responsive to an output of the circuit for determining a correlation and operative for controlling an amplitude of a de-spreading signal.

11. A spread spectrum receiving apparatus as claimed in claim 7 and further including:

an FM demodulator circuit coupled to receive the signal of an intermediate frequency;

circuitry for differentiating a replica of the spreading signal;

a circuit for determining a correlation of the differentiated replica of the spreading signal and an output of the FM demodulator circuit;

a feedback circuit responsive to an output of the circuit for determining a correlation and operative for controlling timing of a de-spreading signal.

12. A spread spectrum transmission apparatus comprising:

an input for accepting a signal;

a spreading waveform generator;

a summing circuit for combining the signal and a spreading waveform of the spreading waveform generator;

a frequency generator having a frequency dependent on an applied signal, and coupled to receive an output of the summing circuit;

an output circuit coupled to receive an output of the frequency generator.

13. A spread spectrum transmission apparatus as claimed in claim 12 and further comprising:

a filter circuit coupled to filter an output of the spreading waveform generator for producing a continuous spreading waveform and connected to couple the filtered spreading waveform to the summing circuit.

14. A spread spectrum receiving apparatus comprising:

an input for accepting a spread spectrum signal;

a frequency generator having a frequency dependent on an applied signal;

a mixing circuit coupled to receive signals from the input and from the frequency generator;

an FM demodulator coupled to receive output from the mixing circuit a de-spreading waveform generator;

a de-spreading waveform control loop responsive to an output of the FM demodulator; including:

timing control circuitry for controlling timing of an output of the de-spreading waveform generator; and an amplitude control circuit for controlling an amplitude of an output of the de-spreading waveform generator.

15. A method of generating a frequency modulated spread spectrum signal, comprising the steps of: summing a signal and a spreading signal;

generating a signal varying in frequency about a center frequency in response to an amplitude of the sum of the signal and the spreading signal.

16. A method of recovering information from an FM spread spectrum signal;

comprising the steps of:

generating a replica of a spreading signal used in transmitting the signal;

generating a signal varying in frequency about a center frequency in response to the replica of a spreading signal for use as a de-spreading signal;

combining by mixing the FM spread spectrum signal and the de-spreading signal;

FM demodulating the signal produced by mixing.

17. A method of recovering information from an FM spread spectrum signal as claimed in claim 16;

comprising the steps of:

demodulating the received spread spectrum signal;

correlating the demodulated signal with the replica of the spreading signal;

controlling an amplitude of the replica of the spreading signal in response to the result of the step of correlating.

18. A method of recovering information from an FM spread spectrum signal as claimed in claim 16;

comprising the steps of:

demodulating the received spread spectrum signal;

differentiating the replica of the spreading signal;

correlating the demodulated spread spectrum signal with the differentiated replica of the spreading signal;

controlling timing of generation of a replica of the spreading signal in response to the result of the correlation step.

* * * * *